(12) United States Patent
Kabiri et al.

(10) Patent No.: US 11,368,809 B2
(45) Date of Patent: Jun. 21, 2022

(54) SINGLE ANTENNA DIRECTION FINDING AND LOCALIZATION

(71) Applicant: IoSea LLC, Aliso Viejo, CA (US)

(72) Inventors: Saman Kabiri, Aliso Viejo, CA (US); Evangelos Kornaros, Boulder, CO (US)

(73) Assignee: IOSEA, LLC, Aliso Viejo, CA (US)

( * ) Notice: Subject to any disclaimer, the term of this patent is extended or adjusted under 35 U.S.C. 154(b) by 510 days.

(21) Appl. No.: 16/537,017

(22) Filed: Aug. 9, 2019

(65) Prior Publication Data

US 2020/0059755 A1 Feb. 20, 2020

Related U.S. Application Data

(60) Provisional application No. 62/719,641, filed on Aug. 18, 2018.

(51) Int. Cl.
*H04W 64/00* (2009.01)
*H04W 4/02* (2018.01)
(Continued)

(52) U.S. Cl.
CPC ............ *H04W 4/023* (2013.01); *H01Q 21/29* (2013.01); *H04B 7/086* (2013.01); *H04W 4/029* (2018.02); *H04W 64/00* (2013.01)

(58) Field of Classification Search
CPC ..... H04W 4/023; H04W 4/027; H04W 64/00; H01Q 21/29
(Continued)

(56) References Cited

U.S. PATENT DOCUMENTS 9,647,868 B2   5/2017   Jiao et al.
9,674,644 B2   6/2017   Polo et al.
(Continued)

FOREIGN PATENT DOCUMENTS

WO   WO-2011146011 A1 * 11/2011   .............. G01S 5/02

OTHER PUBLICATIONS

Souvik Sen, et al., "Avoiding Multipath to Revive Inbuilding WiFi Localization", MobiSys '13 Proceeding of the 11th annual international conference on Mobile systems, applications, and services, pp. 249-262, Taipei, Taiwan, Jun. 25-28, 2013.
(Continued)

*Primary Examiner* — Harry K Liu
(74) *Attorney, Agent, or Firm* — Robert Moll; Douglas L. Weller (57) ABSTRACT

Single antenna direction finding is performed by physically moving a device to different device positions. As the device is physically moved, signal processing hardware within the device is used to make a plurality of signal response measurements of a wireless signal detected by a single antenna of the device. The wireless signal emanates from an object. The plurality of signal response measurements are made by sampling signal response at a plurality of sample times. An inertial measurement system makes a plurality of inertial measurements at the plurality of sample times. The plurality of signal response measurements and the plurality of inertial measurements are used to produce a virtual response array vector. The virtual response array vector is used to calculate a direction of arrival from the object to the device.

17 Claims, 7 Drawing Sheets

(51) Int. Cl.
*H04W 4/029* (2018.01)
*H01Q 21/29* (2006.01)
*H04B 7/08* (2006.01)

(58) Field of Classification Search
USPC .......................................................... 342/423
See application file for complete search history.

(56) References Cited

U.S. PATENT DOCUMENTS

| | | |
|---|---|---|
| 9,860,096 B1 | 1/2018 | Ganwani et al. |
| 9,885,774 B2 | 2/2018 | Kumar et al. |
| 10,094,902 B2 | 10/2018 | Marquez |
| 10,142,778 B2 | 11/2018 | Banerjea |
| 10,292,011 B2 | 5/2019 | Johnson |
| 10,306,405 B2 * | 5/2019 | Persson ................. H04W 4/023 |
| 2014/0269389 A1 | 9/2014 | Bukkfejes et al. |
| 2014/0274115 A1 | 9/2014 | Michalson et al. |
| 2018/0332434 A1 | 11/2018 | Kulkarni et al. |
| 2019/0064312 A1 * | 2/2019 | Jeon ........................... G01S 5/04 |

OTHER PUBLICATIONS

Fan Li, et al. "A Reliable and Accurate Indoor Localization Method Using Phone Inertial Sensors", Conference: Proceedings of the 2012 ACM Conference on Ubiquitous Computing, Sep. 2012.

Manikanta Kotaru, et al., "SpotFi: Decimeter Level Localization Using WiFi", SIGCOMM '15 Proceedings of the 2015 ACM Conference on Special Interest Group on Data Communication, pp. 269-282, 2015.

Swarun Kumar, "Accurate Indoor Localization With Zero Start-up Cost", MobiCom '14 Proceedings of the 20th annual international conference on Mobile computing and networking, pp. 483-494, 2014.

Yaxiong Xie, "mD-Track: Leveraging Multi-Dimensionality in Passive Indoor Wi-Fi Tracking", arXiv:1812.03103, Dec. 7, 2018.

* cited by examiner

SINGLE ANTENNA DIRECTION FINDING AND LOCALIZATION

CROSS REFERENCE TO RELATED APPLICATION

This application claims the benefit of U.S. provisional patent application No. 62/719,641, filed Aug. 18, 2018, the disclosure of which is incorporated by reference herein in its entirety.

BACKGROUND

Localization technology has been widely integrated in daily life applications such as mobile social networking, augmented reality, and so on. Nowadays, localization technology has found wide applications from locating patients inside a hospital to precisely finding directions inside a shopping mall. These applications typically rely on Global Positioning System (GPS) signals which suffer from low-accuracy in indoor environments, especially where the received signal is contaminated by its replica due to presence of the surrounding obstacles.

Indoor direction finding systems often employ antenna arrays to detect the direction of arrival (DOA) of wireless transmissions. Many researchers have worked on antenna array designs to reduce the number of elements while maintaining a good accuracy in a direction of arrival estimation. For example, in N. Behdad, M. A. Al-Joumayly, and M. Li, "Biologically inspired electrically small antenna arrays with enhanced directional sensitivity," *IEEE Antennas and Wireless Propagation Letters*, vol. 10, pp. 361-364, 2011, an array of two electrically small antennas with enhanced phase difference is used to detect the DOA at 300 MHz. This system is built according to the auditory system of a parasitoid fly.

Acoustic frequency signals instead of radio frequency signals are also used for localization purposes in the literature. See for example, A. Savvides, C.-C. Han, and M. B. Strivastava, "Dynamic fine-grained localization in ad-hoc networks of sensors," in *Proceedings of the 7th Annual International Conference on Mobile Computing and Networking*, ser. MobiCom'01. New York, N.Y., USA: ACM, 2001, pp. 166-179. The leverage of the acoustic waves over their counterpart is their lower speed of travel, almost ten thousand times lower, which makes them suitable for time-of-arrival (TOA) or time-difference-of-arrival (TDOA) techniques. See, for example, A. Prorok, P. Tome', and A. Martinoli, "Accommodation of nlos for ultra-wideband tdoa localization in single- and multi-robot systems," in 2011 *International Conference on Indoor Positioning and Indoor Navigation*, September 2011, pp. 1-9, and see also K. C. Ho and W. Xu, "An accurate algebraic solution for moving source location using tdoa and fdoa measurements," *IEEE Transactions on Signal Processing*, vol. 52, no. 9, pp. 2453-2463, September 2004. The paper X. Wang, Y. Xiong, and W. Huang, "An accurate direction finding scheme using virtual antenna array via smartphones," Sensors, vol. 16, no. 11, pp. 1811-1832, November 2016 describes obtaining an accurate direction finding at acoustic frequencies using a virtual uniform linear array (VULA) by uniformly moving the acoustic device across a linear line. Authors in W. Huang, Y. Xiong, X. Y. Li, H. Lin, X. Mao, P. Yang, and Y. Liu, "Shake and walk: Acoustic direction finding and fine-grained indoor localization using smartphones," in *IEEE INFOCOM 2014-IEEE Conference on Computer Communications*, April 2014, pp. 370-378 have proposed an approach using Doppler effects to estimate the velocity and position of a moving acoustic receiver. Their proposed approach is only valid for acoustic waves and will fail for electromagnetic waves which is due to the fact that the velocity of electromagnetic waves is much higher than the velocity of acoustic waves.

DETAILED DESCRIPTION

A device uses a single antenna and a single channel receiver or transmitter to determine a direction of arrival (DOA). For example, the device can be implemented within a smart watch, a smart phone or other device properly equipped with processing capacity, transmission capability, reception capability, and motion sensing capability The transmission and reception of wireless signals can be implemented using a wireless communication protocol such as Bluetooth Low Energy (BLE) technology, Wi-Fi, cellular, 3G/4G/5G technologies or other commonly available wireless technology. For example, the channel state information (CSI) for the wireless communication is utilized to obtain the information needed for direction finding.

Figure 1:
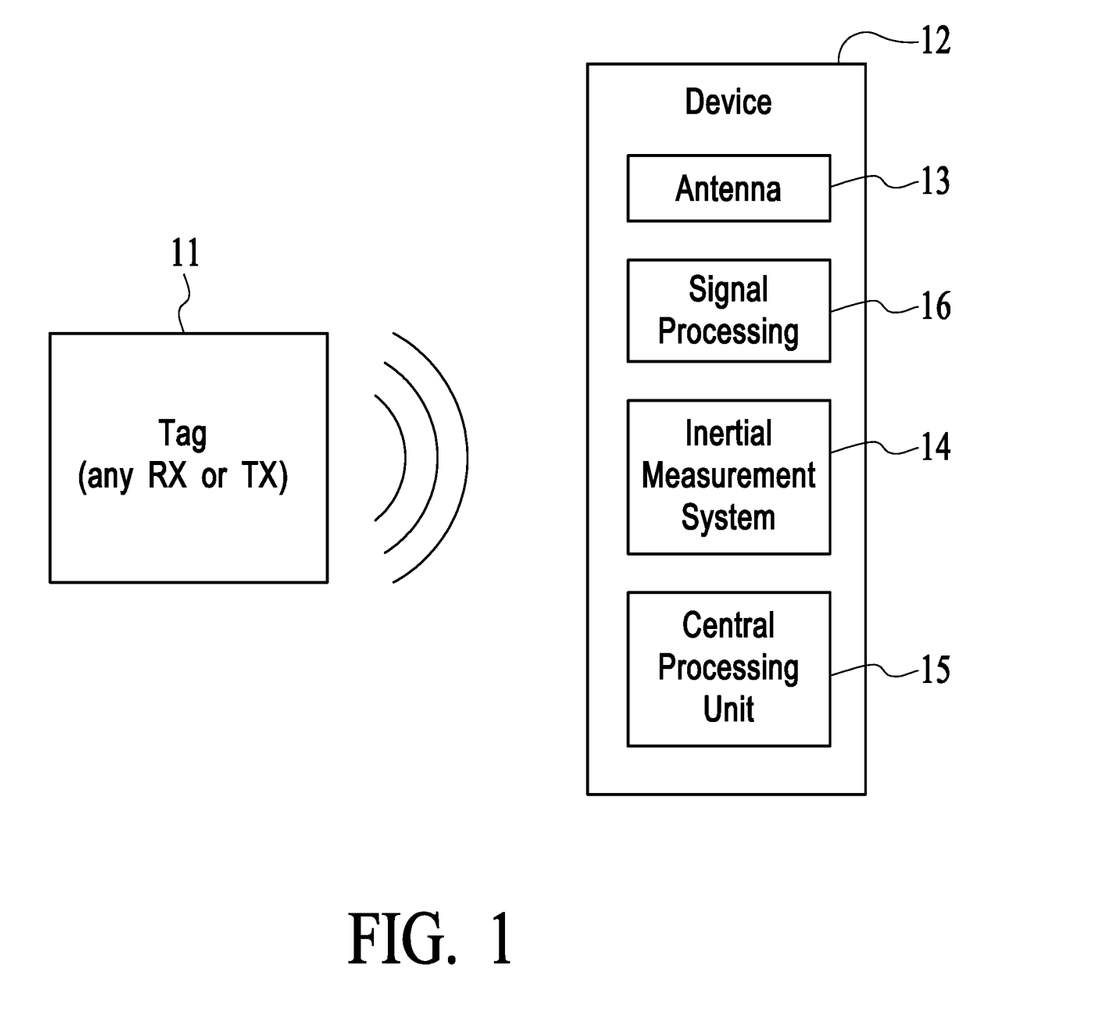
FIG. 1 is a simplified block diagram of a device used for direction finding in accordance with an implementation.

For example, FIG. 1 is a simplified block diagram of a device 12 that includes an antenna 13, an inertial measurement system (IMS) 14 and a central processing unit 15. A signal processing block 16 includes at least some signal processing hardware that performs initial processing of signals received by antenna 13.

For example, a tag 11 is placed on an object to be tracked. For example, tag 11 is a receiving tag or a transmitting tag that is compatible with antenna 13. As discussed above, Bluetooth Low Energy (BLE) technology, Wi-Fi, cellular, 3G/4G/5G technologies or other technologies may be used to implement tag 11, provided there is some detectable wireless transmission between tag 11 and device 12. Alternatively, any object equipped with a radio frequency (RF) transmitter or other frequency transmitter that complies with a transmission standard can be detected. For example, transmission from a speaker, headphones, a television, or any device equipped with transmission capability can be viewed as an object to be tracked.

For example, a camera within device 12 can be used to implement the direction finding technology provided by device 12 into Augmented Reality (AR) technology.

Figure 2:
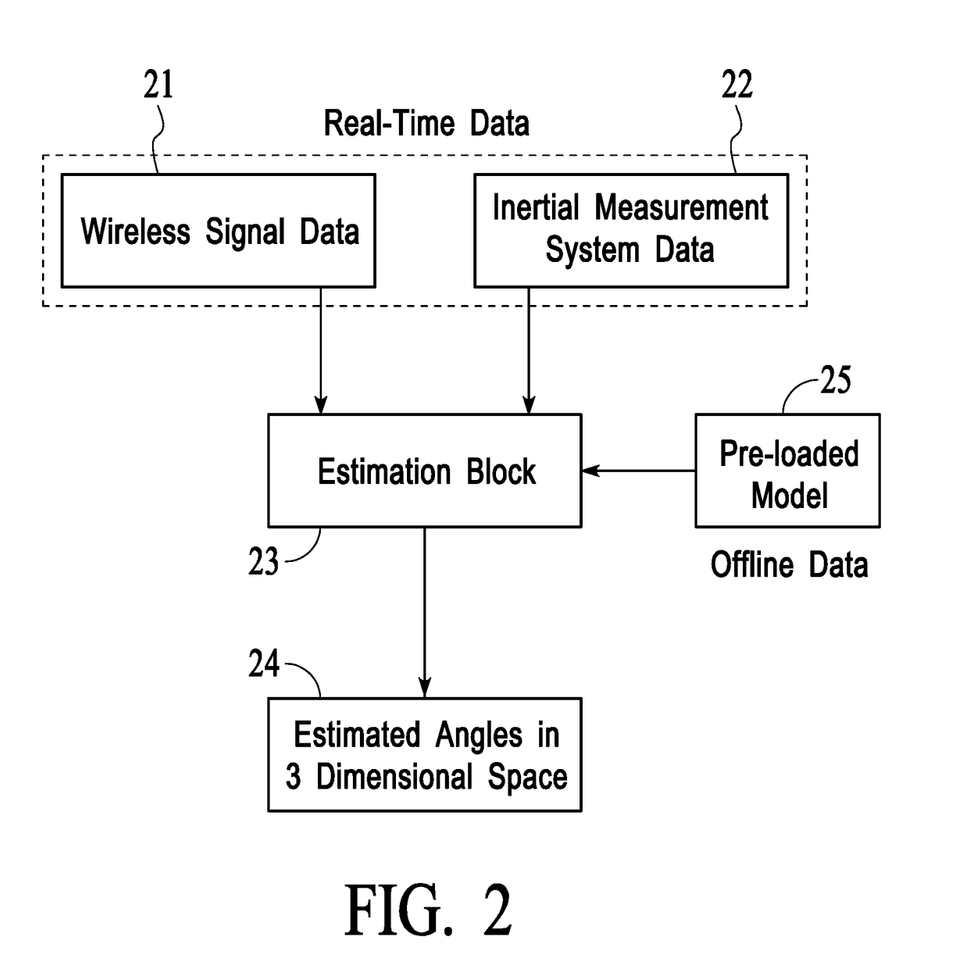
FIG. 2 is a simplified block diagram that illustrates data flow for single antenna direction finding in accordance with an implementation.

FIG. 2 is a simplified block diagram that illustrates data flow for single antenna direction finding. A wireless signal data block 21 represents wireless data from wireless signals detected by antenna 13. The wireless data is processed and forwarded to an estimation block 23. An internal measurement system data block 22 represents receipt of internal measurement system data from an internal measurement system 14 by estimation block 23. A pre-loaded model block 25 represents receipt of pre-loaded model information. Estimation block 23, implemented using central processing unit 15, uses the wireless data, the internal measurement system data and the pre-loaded model information to generate estimated angles in three-dimensional space. For example, the model includes a virtual array response vector (VARV) which when populated will indicate a response signal value for a wireless signal emanating from tag 11 detected by antenna 13 at different device positions. What is meant by a different device position is that the location and/or the orientation of the device vary between different device positions. The populated VARV is used to calculate a direction of arrival (DOA) of the signal from tag 11 for a current device position or another device position. Results block 24 represents the output of the estimated angles which indicate the direction of arrival in three-dimensional space.

Figure 3:
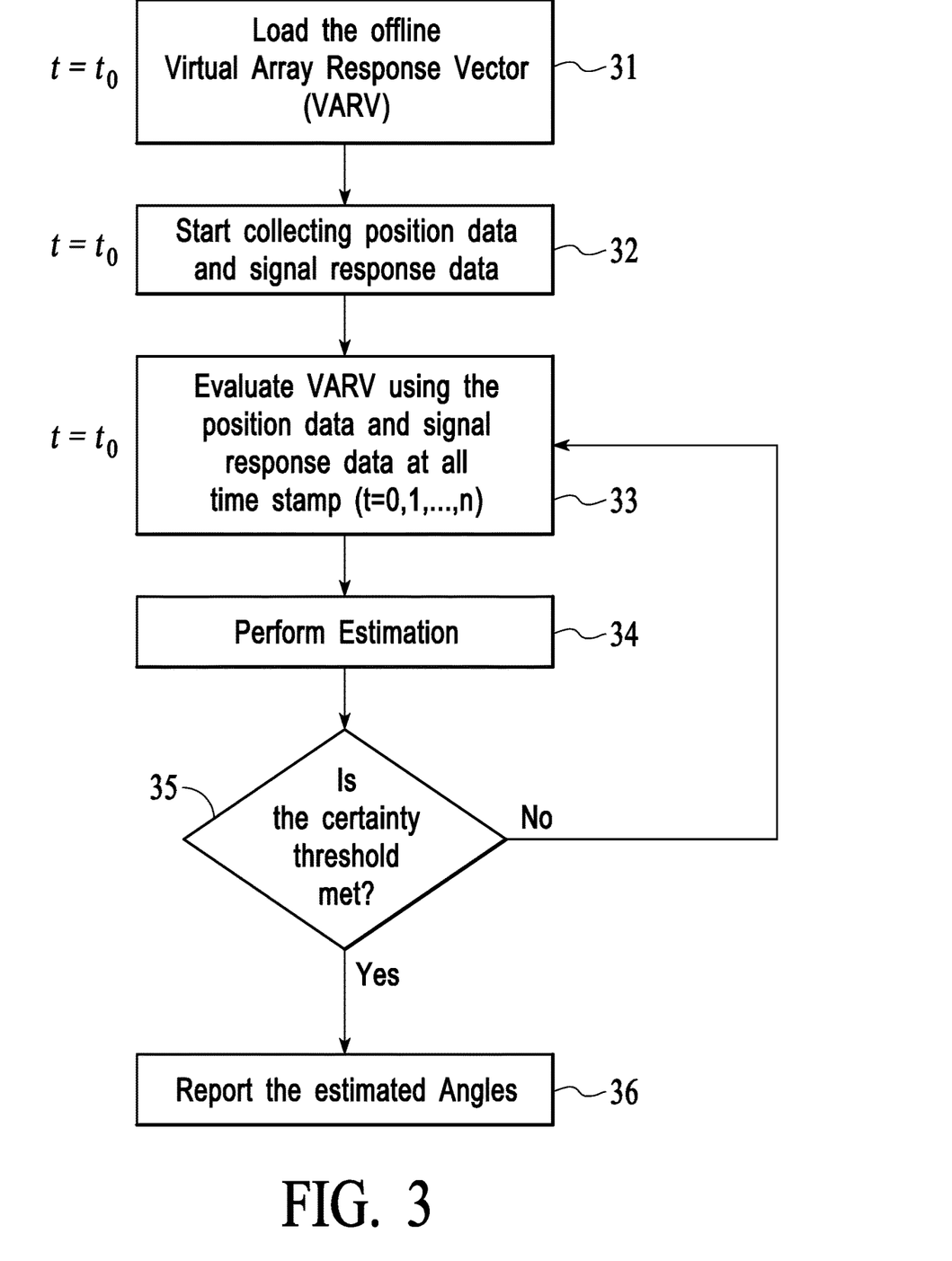
FIG. 3 is a simplified flow chart illustrating operation of an estimation within a direction finding device in accordance with an implementation.

FIG. 3 is a simplified flow chart illustrating operation of estimation block 25. In a block 31, estimation block 23 loads a first row of an offline virtual array response vector (VARV) from pre-loaded model block 25. Additional rows of VARV are to be calculated to indicate for each active element of the array a relative location and orientation of antenna 13 and will include for each element a signal response value detected by antenna 13. In this way, the virtual array response vector (VARV) is a virtual representation of an array response vector that is generated by an array of stationary antennas. While an array response vector is generated by response data from multiple stationary antennas whose relative position is known, the virtual array response array is calculated from a single antenna that moves with the device to several device positions, where the relative positions of the device positions are calculated based on data from an internal measurement system or some other similar system.

In a block 32, estimation block 23 starts collecting device position data and signal response data for various sampling times. For example, the signal response data is generated from wireless signal data block 21. For example the wireless data can be frequency and/or amplitude response information from tag 11 at various sample times. For example, the device position data is data calculated from inertial measurement system (IMS) 14.

To obtain the device position information, inertial measurement system 14 includes, for example, inertial sensors including a three-axis accelerometer and a three-axis gyroscope. The three-axis accelerometer provides the acceleration along each x, y and z axis. The relative velocity and displacement along each axis can be evaluated by integrating once and twice of the corresponding acceleration versus time, respectively. The three-axis gyroscope measures the angular rotation around each axis. Since antenna 13 does not have any restrictions in terms of displacement and rotation, the data obtained by the inertial sensors can be used to estimate relative device position at each sample time.

For example, the angular velocity measured by three-axis gyroscope can be integrated over time to calculate the orientation of inertial measurement system 14. Due to the nature of integration, any error in the gyroscope measurement will result in an accumulating error in orientation calculation. On the other hand, the velocity and position of the unit can be calculated by integrating once and twice over time, respectively. The double integration operation to estimate the unit's position can result in a large error if the accelerometer measurements are erroneous. There are several techniques to ensure that errors in gyroscopes and accelerometers are calibrated such as Kalman-filter and Madgwick-filter. So even when measurement data from inertial measurement system 14 are not highly accurate, the direction finding performance of inertial measurement system 14 is not compromised when such filtering is performed.

Figure 4:
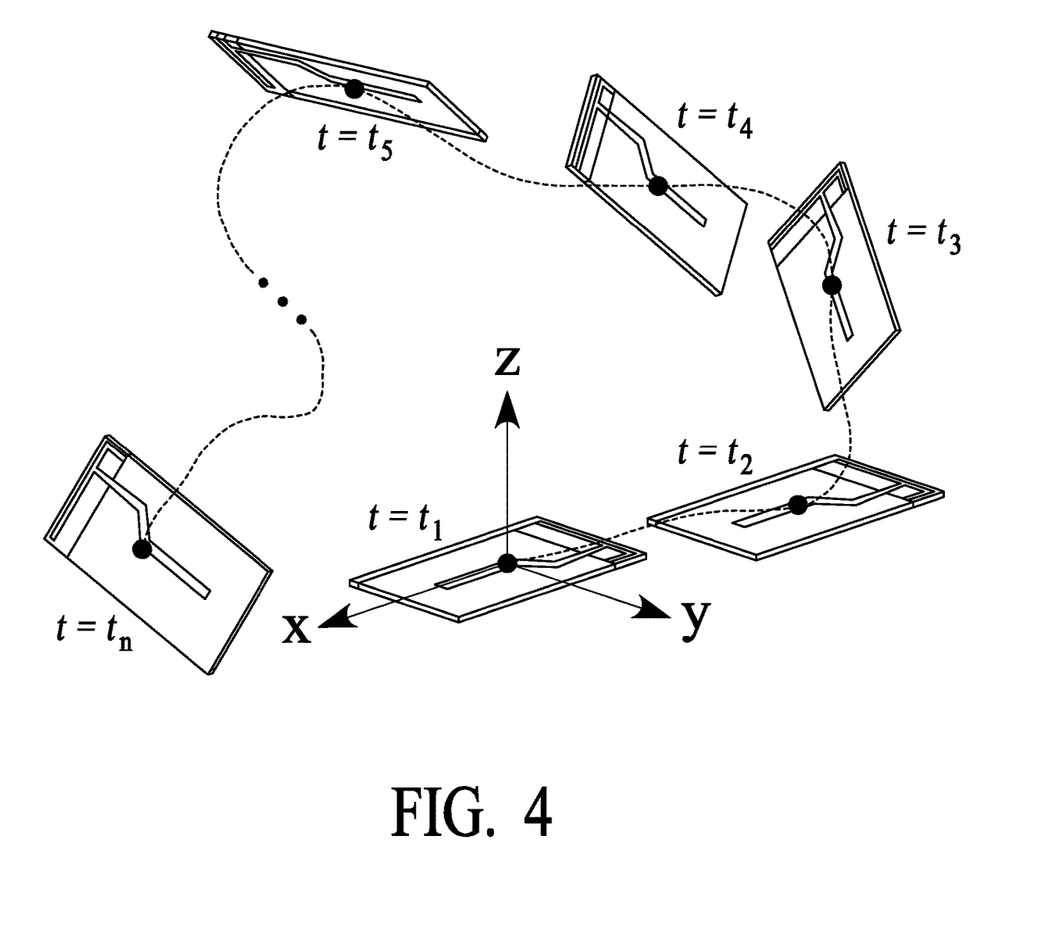
FIG. 4 shows an exemplary arbitrary path that an antenna may follow over time in accordance with an implementation.

FIG. 4 shows an exemplary arbitrary path that antenna 13 may follow over time. The location and orientation of antenna 13 with respect to the initial coordinate system is calculated by inertia measurement system 14.

Inertial measurement system 14 can implemented using any technology that can detected inertial measurements to calculate relative device position. Displacements are taken into account to obtain updated device locations to be entered into an element of VARV. Likewise, rotations can also be calculated, for example, by describing a rotation such as elemental rotation, Euler's rotation, and quaternion rotation. Phase center transformation is performed followed by gain transformation.

While there are various methods to estimate the orientation, currently available inertial measurement units (IMUs) that are completely self-sustained are very attractive options for measuring both orientation and specific force. Thanks to the recent progress in Micro Electrical Mechanical System (MEMS) technology, the size of inertial measurement units are reduced dramatically and they can be easy integrated into the other modules. The benefit of small footprints makes inertial measurement units amenable to be utilized for various applications such as Internet of Things (IoT) applications.

In a block 33, estimation block 23 calculates additional rows of the VARV using the device position data from the internal measurement system data and the signal response data at a series of sample times. Each row of the VARV is calculated at a different sample time. In addition, multiple VARV's can be calculated for different frequencies, adding another dimension of calculation Calculating VARV's at additional frequencies increases the accuracy of estimation.

In a block 34, estimation block 23 performs an estimation of estimated angles in three-dimensional space based on the information in the VARV. The Multiple Signal Classification (MUSIC) algorithm can be performed to estimate the DOA. For example, the elements for the VARV once generated, are reemployed to perform the MUSIC algorithm. This is effective whether antenna 13 is illuminated by a single or multiple incoming signals, and whether the incoming signals are correlated or uncorrelated. Instead of the MUSIC algorithm, other algorithms can be used to the DOA. For example, the Estimation of Signal Parameters via Rotational Invariance Technique (ESPRIT) Algorithm, the Expectation maximization (EM) algorithm, the Space Alternating Generalized EM (SAGE) or another known algorithm be used to calculate DOA.

For example, when estimation block determines estimated angles in three-dimensional space in block 34, a phase center model using phase center contours can be used. For more information about use of phase center contour, see, for example, E. Kornaros, S. Kabiri, and F. D. Flaviis, "A novel model for direction finding and phase center with practical considerations," *IEEE Transactions on Antennas and Propagation*, vol. PP, no. 99, pp. 1-1, 2017 and S. Kabiri, E. Kornaros, and F. D. Flaviis, "Tightly coupled arrays design based on phase center contour for indoor direction findings in harsh environments," *IEEE Transactions on Antennas and Propagation*, 2018.

The phase center (PC) of an antenna appears as an apparent moving point that can be used in the model instead of the geometrical center of the antenna. The arbitrary movement of antenna 13 in three dimensions creates a virtual array of antennas. As discussed above, inertial measurement system 14 can include an inertial measurement unit (IMU) consisting of a three-axis accelerator and a three-axis gyroscope used to measure the displacement across each axis and also the rotation around each axis. Antenna 13 samples the received signal at consecutive device positions in space. Estimation block 23 when performing the estimation in block 34 is able to use the samples as if there were an array of antennas, where elements of the array of antennas are located at each device position where antenna 13 takes a sample. In this way, estimation block 23 determines a direction of arrival (DOA) by considering the consecutive sampled data received by antenna 13 at each time sample.

Figure 6:
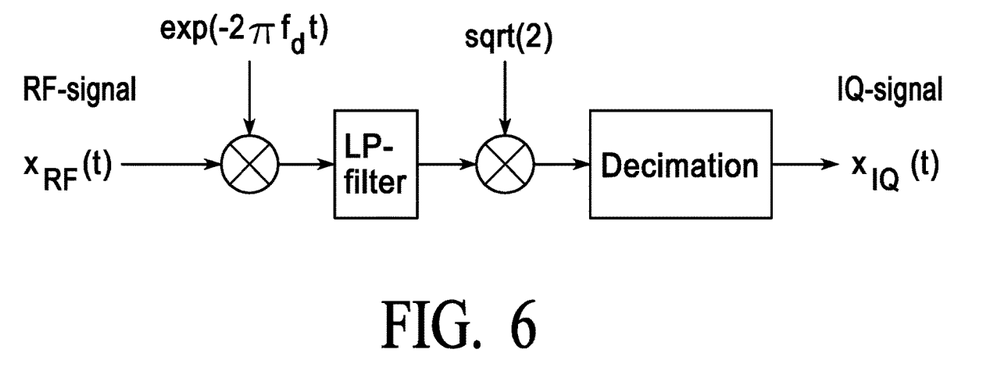
FIG. 6 illustrates computing in-phase (I) and quadrature (Q) components of received signals in accordance with an implementation.

For example, estimation block 23 calculates a direction of arrival estimation in both azimuth and elevation planes. For example, signals received by antenna 13 are narrowband with the same center frequency $f_c$. For example, multiple frequencies $f_c$ can be used in order to improve accuracy. For example, the frequencies are between the edges of the frequency band of the standard under use (e.g. BLE band 2.400-2.4835 GHz). To compute the in-phase (I) and quadrature (Q) components of the received signals, the incoming signals by antenna 13 are sequentially down-converted from a radio frequency (RF) to an intermediate frequency (IF) and from the IF to a baseband. The I component and the Q component create the x(t) data in Equation 1 below and include all the information of the RF signal of interest. This is illustrated in FIG. 6.

For example, when the sampling rate is large enough, the receiving signals appear to arrive from stationary transmitters. After demodulating the received signal and extracting the in-phase and quadrature components, estimation block 23 produces a resulting signal corresponding to the i-th time sample (i.e. the virtual i-th antenna element) with sample index k, which can be denoted as $x_i(t)$ for i=1, . . . , N, where N is the total number of acquired samples. If M incoming signal waveforms $s_1, s_2, \ldots, s_M$ from directions $(\theta_1, \varphi_1), (\theta_2, \varphi_2), \ldots, (\theta_M, \varphi_M)$ are impinging on the array, the output of the N-element array at the t-th sample is organized in an N×1 vector as represented by Equation 1 below.

$$x(t) = [b(\theta_1, \phi_1) b(\theta_2, \phi_2) \ldots b(\theta_M, \phi_M)] \begin{bmatrix} s_1(t) \\ s_2(t) \\ \vdots \\ s_M(t) \end{bmatrix} + n(t) \quad \text{Equation 1}$$

In Equation 1, the N-element Virtual Array Response Vector (VARV) in $\hat{\theta}$ and $\hat{\varphi}$ polarizations, respectively, for an incoming signal from the direction $(\theta_i, \varphi_i)$. $k_1$ and $k_2$ are complex numbers, in general, and B is an N×M matrix called array manifold. For more information on this type of calculation, see E. Ferrara and T. Parks, "Direction finding with an array of antennas having diverse polarizations," IEEE Transactions on Antennas and Propagation, vol. 31, no. 2, pp. 231-236, March 1983.

Accurate modeling of the array manifold is required. For example, in E. Kornaros, S. Kabiri, and F. D. Flaviis, "A novel model for direction finding and phase center with practical considerations," *IEEE Transactions on Antennas and Propagation*, vol. PP, no. 99, pp. 1-1, 2017, a generic representation was introduced that included a more complex representation of the antennas including the individual gain, non-idealities in the form of phase offset and the movement of the phase center from the geometrical center of the antennas. Directive antennas with high isolation were used and thus, the phase center could successfully be modeled as an average single point which is stable due to averaging over a narrow beam width. For 2-Dimensional direction finding applications, the authors in S. Kabiri, E. Kornaros, and F. D. Flaviis, "Tightly coupled arrays design based on phase center contour for indoor direction findings in harsh environments," IEEE Transactions on Antennas and Propagation, 2018 have demonstrated that by discretizing the phase pattern of an antenna over the azimuth plane, i.e. the 360° field of view, one can find the displacement of the phase center relative to the geometrical center of the antenna for each angle of the discretization. Therefore the phase center can be represented by a contour of displaced points for each angle $\varphi_i$. A contour of the phase center for each polarization in 3-Dimensional space $(\theta_i \in [0°, 180°], \varphi_i \in [0°, 360°])$ is obtained. Furthermore, the phase center contour concept can generalize the data model and make the DOA estimation more accurate as extensively investigated in S. Kabiri, E. Kornaros, and F. D. Flaviis, "Tightly coupled arrays design based on phase center contour for indoor direction findings in harsh environments," *IEEE Transactions on Antennas and Propagation*, 2018. As a result, the VARV for both $\hat{\theta}$ and $\hat{\varphi}$ polarizations at the initial time $t=t_1$ can be written as set out in Equation 2 below:

$$a_\theta^{(1)}(\theta_i,\phi_i) = g_\theta^{(1)}(\theta_i,\phi_i) e^{-j\vec{k}_0 \cdot (\vec{r}_1 + \vec{d}_\theta^{(1)}(\theta_i,\phi_i))} e^{-j\gamma_1}$$

$$a_\phi^{(1)}(\theta_i,\phi_i) = g_\phi^{(1)}(\theta_i,\phi_i) e^{-j\vec{k}_0 \cdot (\vec{r}_1 + \vec{d}_\phi^{(1)}(\theta_i,\phi_i))} e^{-j\gamma_1} \quad \text{Equation 2}$$

In Equation 2, the $k_0$ vector is the wavevector and $g^{(1)}(\theta_i, \varphi_i)$ and $g^{(1)}(\theta_i, \varphi_i)$ are the voltage gain patterns of the single antenna at the initial time in the direction $(\theta_i, \varphi_i)$ along $\hat{\theta}$ and $\hat{\varphi}$ polarizations, respectively. This is in essence the information contained in a row of the VARV.

As shown in E. Muehldorf, "The phase center of horn antennas," *IEEE Transactions on Antennas and Propagation*, vol. 18, no. 6, pp. 753-760, November 1970, one can obtain the phase center location along any arbitrary polarization by knowing the phase center in two orthogonal polarizations which are $\hat{\theta}$ and $\hat{\varphi}$. The phase center contour can be exploited to improve the ARV where it is assumed that for each lattice of 9 consecutive points there is a phase center associated to the middle point of the lattice.

Figure 5:
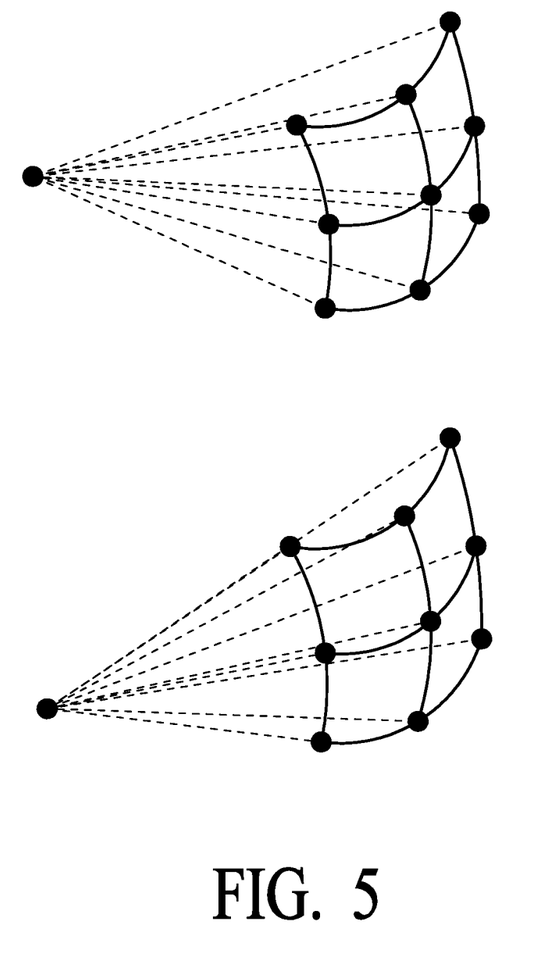
FIG. 5 illustrates phase center contour discretization where it is assumed that a phase center does not move within a nine-point lattice in accordance with an implementation.

This is illustrated in FIG. 5. FIG. 5 illustrates phase center contour discretization where it is assumed that the phase center does not move within each nine-point lattice. For consecutive points there is a phase center associated to the middle point of the lattice. FIG. 5 suggests how to discretize the field of view of $(\theta_i \in [0°, 180°], \varphi_i \in [0°, 360°])$. For example, other lattice topologies can be used based on the application and can further improve the performance of the model. Hexagonal, octagonal or sparse configurations.

Using the procedure explained in details in W. Kunysz, "Antenna phase center effects and measurements in gnss ranging applications," in *Antenna Technology and Applied*

*Electromagnetics & the American Electromagnetics Conference (ANTEM-AMEREM)*, 2010 14th *International Symposium on*. IEEE, 2010, pp. 1-4, the ARVs along both polarizations can be obtained using Equation 2, above. As antenna 13 displaces or rotates, updated ARVs are calculated from the two initial ARVs. This includes finding the updated gain patterns and phase center locations in both polarization in respect to the initial coordinate system.

In a block 35, estimation block 23 determines whether a certainty threshold is met. If not, additional measurements are made in different device positions of antenna 13. This allows for the calculation of additional rows of the VARV in block 33. The additional rows of VARV provide additional resolution of the calculations of the DOA. For a handheld device, this can be enabled by continuing to move the device. For a very brief and short movement, more measurement points can be selected. The number of the maximum acquired measurement points is defined by the sampling rate of the system.

The certainty threshold is application dependent. It is selected as a trade-off among accuracy, latency and computational capacity of the processor in use. As an example, a smaller amount of data points from the IMU and the RF channel can be used for the calculation in order to decrease the latency of the system and the processing time. Increase sample data acquired will increase the accuracy of the calculation.

In a block 36, estimation block 23 reports the estimated angles to results block 24. The estimated angles indicate a three-dimensional direction of arrival obtained using a single antenna. The phase center contour concept is used to model the performance of the single antenna. The virtual array response of the single antenna is obtained by displacing or rotating the antenna over time. For example, the MUSIC algorithm is expanded to dual-polarization cases for the 3-Dimensional space. The MUSIC spectrum is computed under several scenarios of (1) multiple incoming signals, and (2) correlated signals.

Although the present invention has been described in accordance with the embodiments shown, one of ordinary skill in the art will readily recognize that there could be variations to the embodiments, and those variations would be within the spirit and scope of the present invention.

For example, as discussed above, various algorithms such as the Estimation of Signal Parameters via Rotational Invariance Technique (ESPRIT) Algorithm, the Expectation maximization (EM) algorithm, the Space Alternating Generalized EM (SAGE) or another known algorithm be used to calculate DOA.

Further, DOA can be calculated using Angle of Arrival (AoA) or Angle of Departure (AoD). The Angle of Arrival (AoA) refers to a system of a wireless transmitter (TX) and receiver (RX) pair, in which the receiver (RX) calculates the angle of the incident signal from the transmitter (TX). Angle of Departure (AoD) refers to a system of a wireless TX and RX pair, in which the transmitter calculates the angle of the departed signal. In principle, the same locator can be used for enabling both AoA and AoD, simultaneously. For example AoD and AoA can be differentiated by which side of the pair performs the calculations.

Figure 7:
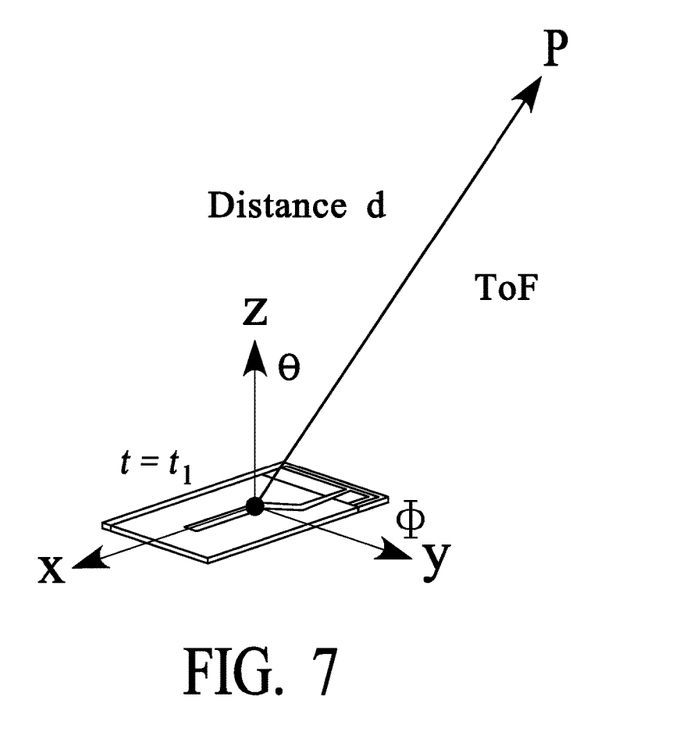
FIG. 7 illustrates localizing a target (P) by utilizing angular information from calculations at different locations of a device in accordance with an implementation.

Also, several methods can be used to localize a target (P) by utilizing the angular information from the calculations at different locations of the device. For example, as illustrated by FIG. 7, the location of the target (P) is estimated from the knowledge of the angles θ, φ and the distance d which can be calculated by using the time of flight (ToF) of the signal of interest between the transmitter and receiver.

Figure 8:
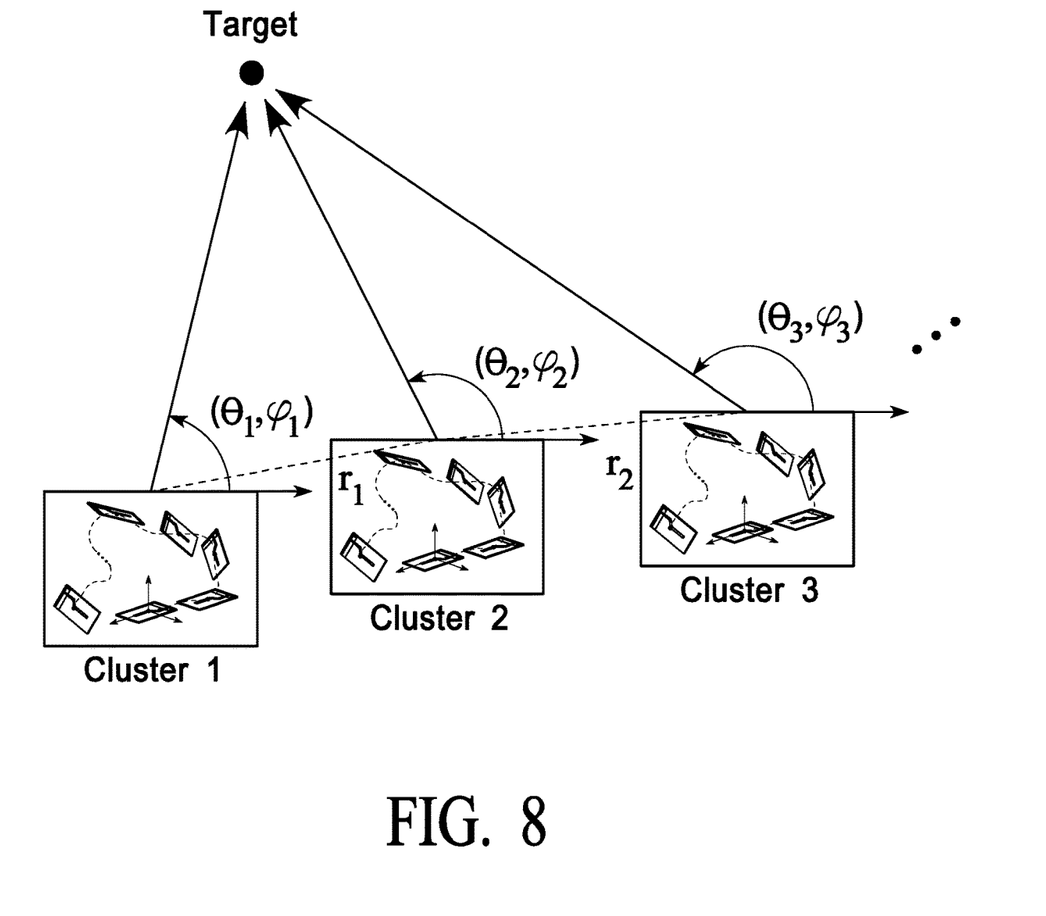
FIG. 8 illustrates using clusters of movements to accurately find the location of a target in accordance with an implementation.

FIG. 8 illustrates using clusters of movements to accurately find the location of a target. In FIG. 8, $\theta_1$, $\varphi_1$, $\theta_2$, $\varphi_2$, $\theta_3$, $\varphi_3$, etc., are obtained using Equation 2, as described above. Locations etc., are obtained from IMU data as described above. Knowing these parameters allows the exact location to be obtained. The more clusters used, the more accurate the localization becomes. Also, as the number of clusters increase, this increases the toleration for more inaccurate estimation of locations $r_i$. For additional information on Localization, see for example, Elahe Soltanaghaei, et al, "Multipath Triangulation: Decimeter-level WiFi Localization and Orientation with a Single Unaided Receiver", MobiSys '18: Proceedings of the 16th Annual International Conference on Mobile Systems, Applications, and Services, Pages 376-388, Munich, Germany—Jun. 10-15, 2018, Pages 376-388.

Accordingly, many modifications may be made by one of ordinary skill in the art without departing from the spirit and scope of the appended claims.

What is claimed is:

1. A method for single antenna direction finding, the method being performed by a device, the method comprising:
   collecting device position data and signal response data, including:
      physically moving the device to different device positions, and as the device is physically moving, performing the following:
         using hardware within the device to make a plurality of signal response measurements of a wireless signal detected by a single antenna of the device, the wireless signal emanating from an object, the plurality of signal response measurements being made by sampling signal response at a plurality of sample times, wherein during the plurality of sample times, the device is at a plurality of different device positions, and
         using an inertial measurement system to make a plurality of inertial measurements at the plurality of sample times, the plurality of inertial measurements providing information that allows calculation of relative device position of the plurality of different device positions with respect to each other;
   using the plurality of signal response measurements and the plurality of inertial measurements to produce a virtual response array vector; and
   using the virtual response array vector to calculate a direction of arrival from the object to the device, wherein using the plurality of signal response measurements and the plurality of inertial measurements to produce a virtual response array vector, includes loading a model of a virtual response array vector, and populating the model of the virtual response array vector with data based on the plurality of signal response measurements and the plurality of inertial measurements.

2. A method as in claim 1, wherein the plurality of sample times is sufficient so that the direction of arrival is calculated to a certainty that meets a predetermined threshold.

3. A method as in claim 1, wherein the wireless signal is a Bluetooth Low Energy (BLE) protocol compatible wireless signal generated by a BLE tag within the object or from a device equipped with a Bluetooth or BLE transmitter.

4. A method as in claim 1, wherein the wireless signal is a 5G protocol compatible wireless signal.

5. A method as in claim 1, wherein the plurality of signal response measurements are also made by sampling signal response at a plurality of different frequencies.

6. A method as in claim 1, wherein the hardware within the device that makes the plurality of signal response measurements is an inertial measurement unit (IMU) that includes a three-axis accelerator and a three-axis gyroscope.

7. A device that performs single antenna direction finding, the device comprising:
   an antenna that physically moves with physical movement of the device;
   signal response hardware within the device that is used to make a plurality of signal response measurements of a wireless signal detected by the antenna; an inertial measurement system that makes inertial measurements that provides information that allows calculation of relative device position of the device as the device is moved to different device positions; and
   an estimation block that uses a plurality of signal response measurements received from the signal response hardware from wireless signals emanating from an object and uses a plurality of inertial measurements from the inertial measurement to produce a virtual response array vector, wherein the estimation block uses the virtual response array vector to calculate a direction of arrival of the wireless signals emanating from the object, and wherein the plurality of signal response measurements are made by sampling signal response at a plurality of sample times at a plurality of different device positions and wherein the plurality of inertial measurements are made at the plurality of sample times, and
   wherein the estimation block produces the virtual response array vector by loading a model of a virtual response array vector and by populating the model of the virtual response array vector with data based on the plurality of signal response measurements and the plurality of inertial measurements.

8. A device as in claim 7, wherein the plurality of sample times is sufficient so that the direction of arrival is calculated to a certainty that meets a predetermined threshold.

9. A device as in claim 7, wherein the wireless signal is a Bluetooth Low Energy (BLE) protocol compatible wireless signal generated by a BLE tag within the object.

10. A device as in claim 7, wherein the wireless signal is a 3G/4G/5G protocol compatible wireless signal or a WiFi or cellular compatible wireless signal.

11. A device as in claim 7, wherein the plurality of signal response measurements are also made by sampling signal response at a plurality of different frequencies.

12. A device as in claim 7, wherein the inertial measurement system includes an inertial measurement unit (IMU) that has a three-axis accelerator and a three-axis gyroscope.

13. Non-transitory media that includes software which when run on a device that has a processor, an antenna, signal processing hardware and an inertial measurement system, performs a method for single antenna direction finding, the method comprising:
   collecting device position data and signal response data when the device is physically moved, including:
   receiving from the signal processing hardware within the device a plurality of signal response measurements of a wireless signal detected by the antenna of the device, the wireless signals emanating from an object, the plurality of signal response measurements being made by sampling signal response at a plurality of sample times, wherein during the plurality of sample times, the device is at a plurality of different device positions, and receiving from the inertial measurement system a plurality of inertial measurements at the plurality of sample times, the plurality of inertial measurements providing information that allows calculation of relative device position of the plurality of different device positions with respect to each other;
   using the plurality of signal response measurements and the plurality of inertial measurements to produce a virtual response array vector; and
   using the virtual response array vector to calculate a direction of arrival from the object to the device, and wherein using the plurality of signal response measurements and the plurality of inertial measurements to produce a virtual response array vector, includes loading a model of a virtual response array vector, and populating the model of the virtual response array vector with data based on the plurality of signal response measurements and the plurality of inertial measurements.

14. Non-transitory media as in claim 13, wherein the plurality of sample times is sufficient so that the direction of arrival is calculated to a certainty that meets a predetermined threshold.

15. Non-transitory media as in claim 13, wherein the wireless signal is a Bluetooth Low Energy (BLE) protocol compatible wireless signal generated by a BLE tag within the object.

16. Non-transitory media as in claim 13, wherein the wireless signal is a 5G protocol compatible wireless signal.

17. Non-transitory media as in claim 13, wherein the hardware within the device that makes the plurality of signal response measurements is an inertial measurement unit (IMU) that includes a three-axis accelerator and a three-axis gyroscope.

* * * * *